United States Patent
Chen

(10) Patent No.: US 6,619,977 B1
(45) Date of Patent: Sep. 16, 2003

(54) MECHANISM FOR REMOVABLY FASTENING ELECTRONIC DEVICE TO COMPUTER CASE

(75) Inventor: Chiu-Nan Chen, Taipei (TW)

(73) Assignee: First International Computer, Inc. (TW)

( * ) Notice: Subject to any disclaimer, the term of this patent is extended or adjusted under 35 U.S.C. 154(b) by 0 days.

(21) Appl. No.: 10/162,924

(22) Filed: Jun. 6, 2002

(51) Int. Cl.[7] ............................................. H01R 13/627
(52) U.S. Cl. ...................................................... 439/358
(58) Field of Search ................................ 439/357, 358, 439/350–356

(56) References Cited

U.S. PATENT DOCUMENTS 5,716,228 A * 2/1998 Chen ........................ 439/358
6,146,205 A * 11/2000 Lai ........................... 439/358
6,149,451 A * 11/2000 Weber ...................... 439/358
6,371,788 B1 * 4/2002 Bowling et al. ............ 439/358

* cited by examiner

Primary Examiner—Gary Paumen
(74) Attorney, Agent, or Firm—Bacon & Thomas PLLC

(57) ABSTRACT

The present invention is to provide a mechanism for removably fastening an electronic device to a sub-frame of computer case, which comprises two pairs of first support member and second support member both in a shape of elongate plate, the first support members and second support members can be engaged with each other and mounted on the left and right sides of an electronic device respectively, enabling the electronic device to be sliding into a sub-frame of a computer case and installed in therein.

7 Claims, 3 Drawing Sheets

MECHANISM FOR REMOVABLY FASTENING ELECTRONIC DEVICE TO COMPUTER CASE

FIELD OF THE INVENTION

The present invention relates to a fastening of electronic device and more particularly to an improved mechanism for removably fastening an electronic device to a computer case.

BACKGROUND OF THE INVENTION

Conventionally, an electronic device (e.g., CD-ROM, floppy disk, or the like) is secured to a sub-frame of a computer case by means of a plurality of screws while a user installing the electronic device into a computer for use. However, the prior art suffered from several disadvantages. For example, in a process of replacing the electronic device from the computer, the user has to first disassemble the computer case (i.e., disassemble upper and lower cases and panels) by using a screwdriver to unfasten all the screws for detaching the CD-ROM or floppy disk from the sub-frame of the computer case. Then, removing the CD-ROM or floppy disk from the computer, and securing a new CD-ROM or floppy disk to the computer case by means of a plurality of screws. Finally, after assembling the upper and lower cases and the panels of the computer case together, the new CD-ROM or floppy disk is thus installed into the computer. In view of the above, the replacement process is very tedious and, bringing inconvenience to the user. Moreover, in a case that the newly installed CD-ROM or floppy disk is malfunctioned, or needed to be updated, the above disassembly and assembly processes have to be performed again in order to successfully install a new one in the computer. In view of this, it is very inconvenient to the user due to the time consuming, labor consuming, and complicated procedures in the disassembly and assembly processes.

Additionally, a solution is proposed by providing two side fastening members on the left and right sides of the CD-ROM or floppy disk, the side fastening members are then fastened to the left and right sides of the sub-frame of the computer case in order to secure the CD-ROM or floppy disk to the sub-frame of the computer case. However, the solution still suffered from several disadvantages. For example, the side fastening members (i.e., left and right ones) are not the identical. Hence, two molds are required in the manufacturing process for manufacturing the left and right side fastening members, resulting in an increase in the manufacturing cost. Moreover, the left and right side fastening members are not interchangeable in fastening the CD-ROM or floppy disk to the sub-frame of the computer case due to the limitation of orientation. In other words, the left side fastening member is prohibited from assembling on the right side of the CD-ROM or floppy disk. This may bring inconvenience and causing problems in the assembly process. Hence, it is desirable to provide an improved mechanism capable of removably fastening an electronic device to a computer case in order to overcome the above drawbacks of the prior art.

SUMMARY OF THE INVENTION

It is an object of the present invention to provide a mechanism for removably fastening an electronic device to a sub-frame of a computer case wherein the mechanism comprises two pairs of first support member and second support member both in a shape of elongate plate, each of the first support member and second support member are engaged with each other and then mounted on the left and right sides of the electronic device respectively. Thereafter, it is possible of easily installing the electronic device in the sub-frame. By utilizing this mechanism, it is possible of eliminating disadvantages associated with the prior art such as the time consuming, labor consuming, and complicated in the assembly and disassembly processes. Further, the left and right pairs of the first support member and second support member mounted on the sub-frame of computer case are interchangeable, thereby eliminating the orientation limitation of the prior art in assembly. Moreover, the manufacturing cost is lowered since there is no need to prepare two molds for the fastening members in the manufacturing process.

It is another object of the present invention to provide a mechanism for removably fastening an electronic device to a sub-frame of a computer case. The invention can significantly reduce an electromagnetic interference caused by the electronic device, since the second support members are formed of conductive material and have a plurality of latch pieces engaged with the sides of the first support members, allowing the latch pieces to contact with the rails of the sub-frame while the second support members sliding into the computer along the rails.

The above and other objects, features and advantages of the present invention will become apparent from the following detailed description taken with the accompanying drawings.

DETAILED DESCRIPTION OF THE PREFERRED EMBODIMENTS

Figure 1:
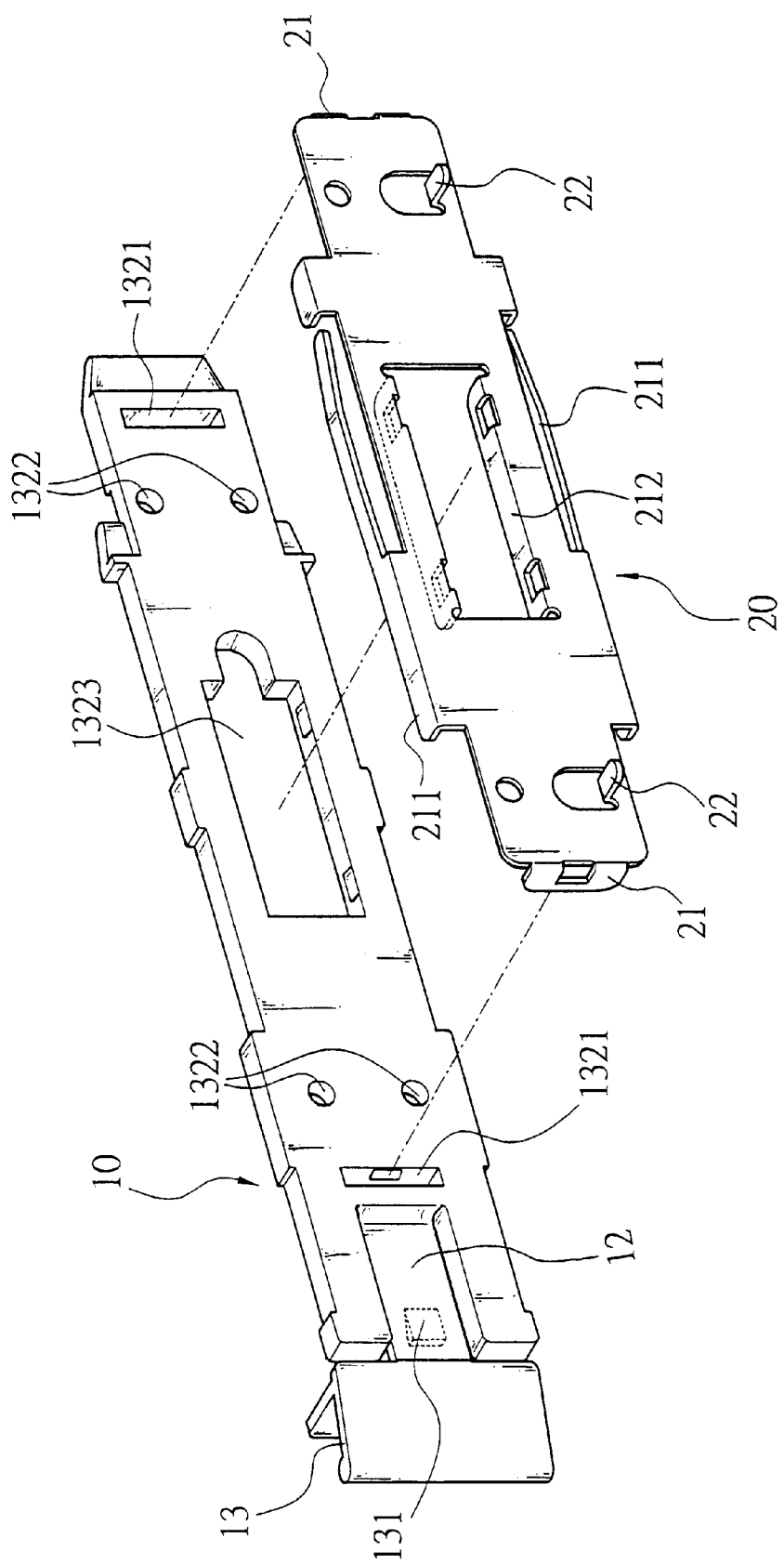
FIG. 1 is an exploded view of a preferred embodiment of mechanism according to the invention.
Figure 2:
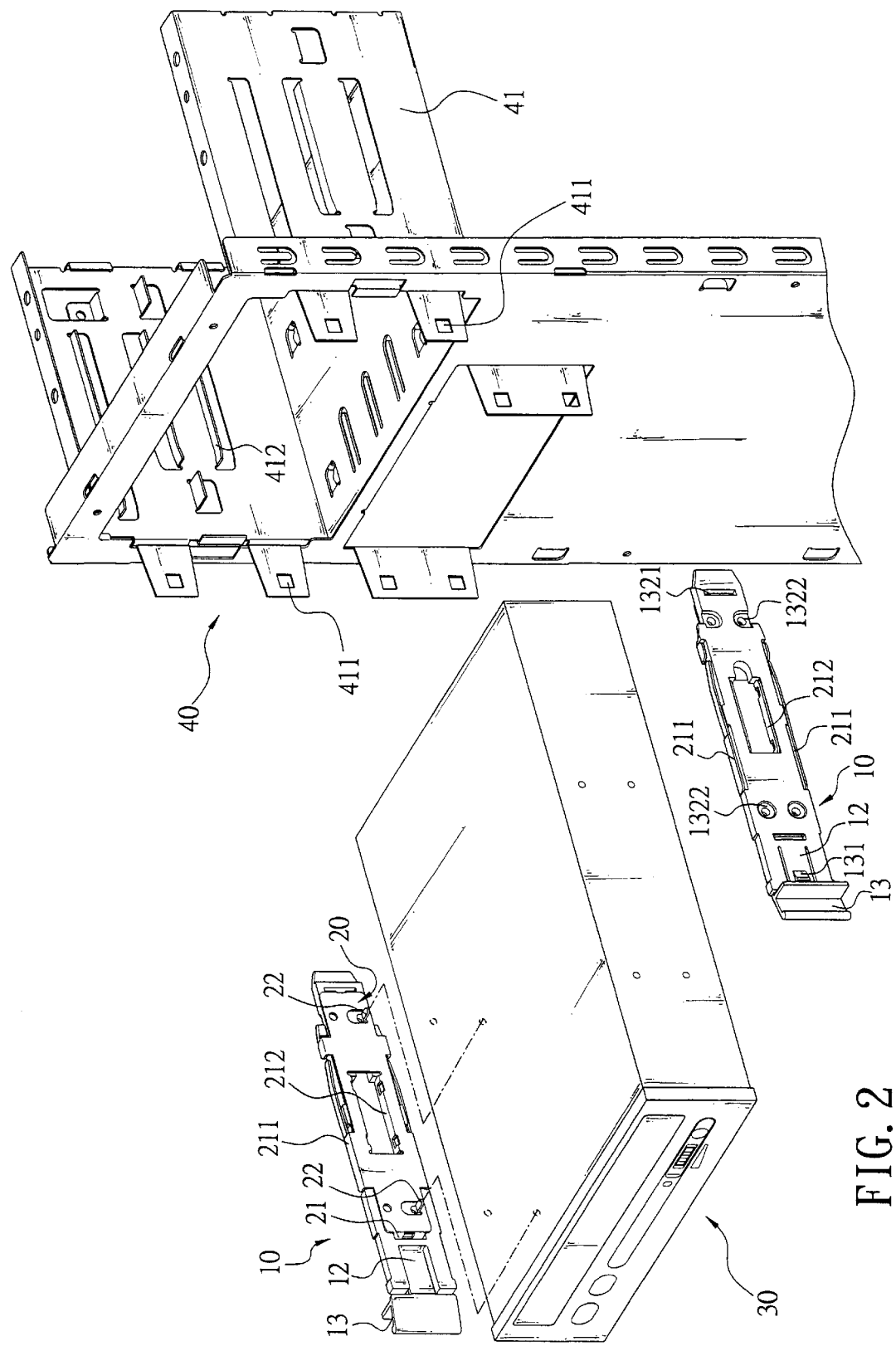
FIG. 2 is an exploded view illustrating a possible assembly of a CD-ROM in the computer case by two mechanisms shown in FIG. 1.

Referring to FIGS. 1 and 2, there is shown a mechanism for removably fastening an electronic device to a computer case in accordance with the invention. The mechanism comprises two pairs of a first support member 10 and a second support member 20 both in a shape of elongate plate. The first support member 10 comprises a resilient arm 12 at a front end, a finger tab 13 at a front end of the resilient arm 12, the finger tab 13 being operable to deform the resilient arm 12 temporarily, at least one snapping member (one is shown) 131 on an outer side of the resilient arm 12, the snapping member 131 being a wedge, and a plurality of openings between the resilient arm 12 and a rear end. In the invention, the plurality of openings consist of one front slot 1321 adjacent to the resilient arm 12, two first holes 1322 adjacent to the front slot 1321, one central elongate slot 1323, one rear slot 1321 at the rear end of the first support member 10, and two second holes 1322 between the rear slot 1321 and the central elongate slot 1323.

In the invention, the second support member 20 is formed of conductive material and is also in a shape of elongate plate having a length smaller than that of the first support member 10. The second support member 20 comprises a plurality of first latch pieces 21, 211, 212 perpendicular to the body of the second support member 20 and a plurality of second latch pieces 22 also perpendicular to the body of the second support member 20, but on the side opposite to the first latch pieces 21. In assembly, the first latch pieces 21 are clung to the slots 1321 of the first support member 10 wherein one front first latch piece 21 is engaged with the front slot 1321 of the first support member 10, two central first latch pieces 211 are engaged with the upper and lower sides of the second support member 20 at the position around the central elongate slot 1323, another two central first latch pieces 212 are engaged with the upper and lower sides of the central elongate slot 1323, and one rear first latch piece 21 is engaged with the rear slot 132 respectively. In the invention, the second latch pieces 22 are clung to two opposite sides of an electronic device 30 such as CD-ROM (shown) or floppy disk.

In the invention, the mechanism further comprises a portion of computer case 40 having at least one sub-frame 41. At least one pair of snapping members 411 are provided on two front ends of the sub-frame 41. In the embodiment, the snapping member 411 is a hole. There are further provided at least one pair of rails 412 on the inner sides of the sub-frame 41. Note that the provision of rails 412 can facilitate the mounting of the electronic device 30 in the sub-frame 41 and the second support member 20 therein. Also, it is possible of engaging the snapping members 131 of the support member 10 with the snapping members 411 of the sub-frame 41 for fastening the electronic device 30 in the sub-frame 41 of computer case 40.

Figure 3:
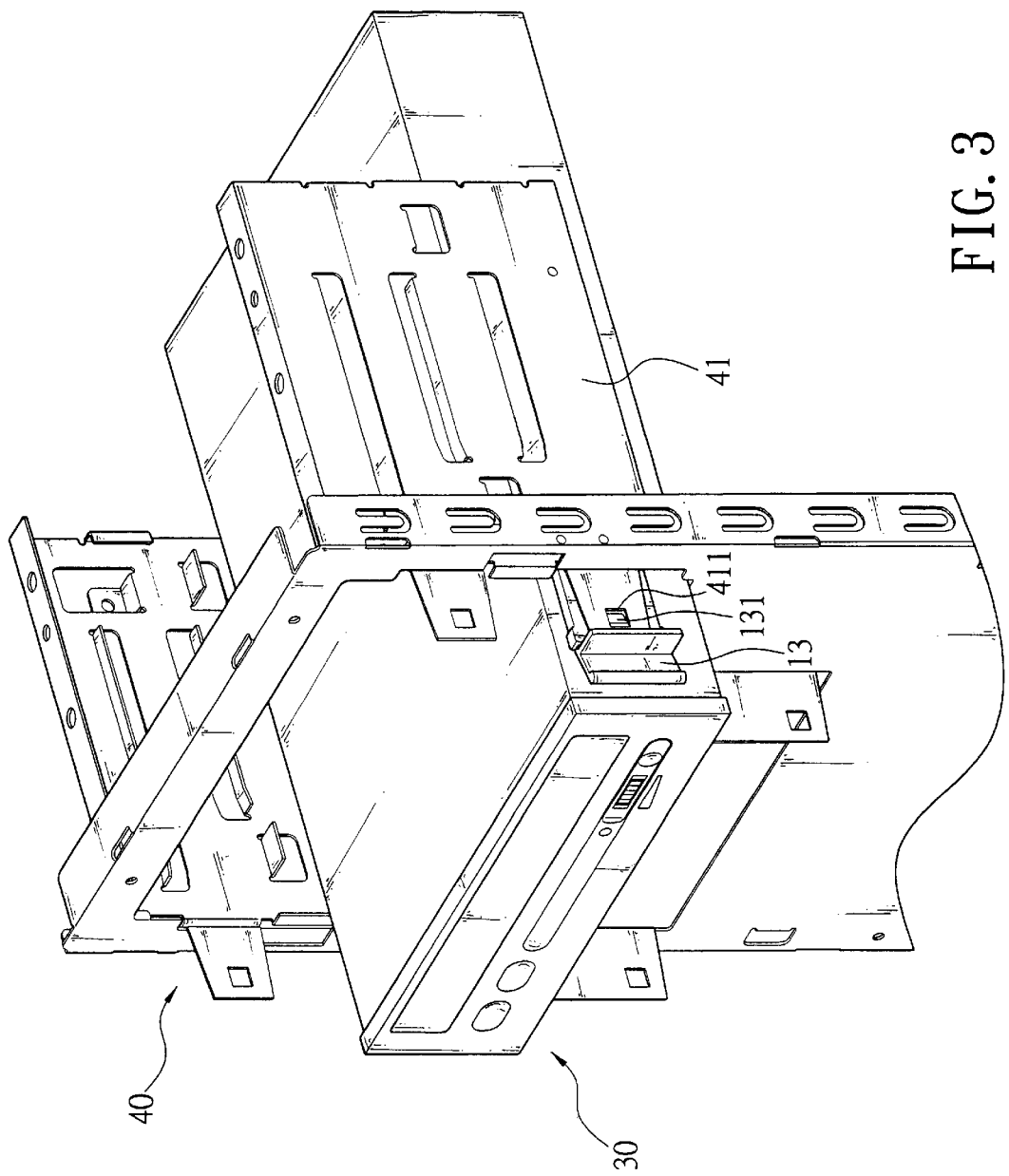
FIG. 3 is a perspective view of the assembled CD-ROM in the computer case.

Referring to FIG. 3, the assembly of the invention will now be described below. After the second support members 20 have been assembled with the first support members 10, with the second latch pieces 22 clung onto the sides of the electronic device 30, it is possible of sliding the electronic device 30 into the sub-frame 41 along the rails 412. At the same time, engage the snapping members 131 of support members 10 with the snapping members 411 of the sub-frame 41 in order to secure the electronic device 30 to the sub-frame 41 of the computer case 40. To the contrary in a removing process of the electronic device 30, user can press the finger tabs 13 to deform the resilient arms 12 for disengaging the snapping members 131 from the snapping members 411. As an end, user can easily remove the electronic device 30 from the sub-frame 41.

In brief, the invention can removably fasten an electronic device 30 to the sub-frame 41 of the computer case wherein the electronic device 30 has two pairs of the first support member 10 and second support member 20 mounted on the left and right sides of the electronic device 30. Thereafter, user can easily install the electronic device in the sub-frame 41. The invention thus eliminate disadvantages associated with the prior art such as time consuming, labor consuming, and complicated. Further, the left and right pairs of the first support member 10 and second support member 20 of the invention are interchangeable, thereby eliminating the orientation limitation of the prior art in assembly. As a result, the manufacturing cost is lowered since there is no need to prepare two molds in the manufacturing process. Moreover, since the second support members 20 are formed of conductive material and have a plurality of latch pieces 211 engaged with the sides of the first support members 10, allowing the latch pieces 211 to contact with the rails 412 of the sub-frame 41 while the second support members 20 sliding into the computer along the rails 412. Thus, an electromagnetic interference caused by the electronic device 30 can be significantly reduced.

While the invention herein disclosed has been described by means of specific embodiments, numerous modifications and variations could be made thereto by those skilled in the art without departing from the scope and spirit of the invention set forth in the claims.

What is claimed is:

1. A mechanism for removably fastening an electronic device to a computer case comprising:

pairs of a first support member each in a shape of an elongate plate, each of the first support member having a resilient arm at a front end, a finger tab at a front end of the resilient arm, the finger tab being operable to deform the resilient arm, at least one snapping member on an outer side of the resilient arm, and a plurality of openings between the resilient arm and a rear end of the first support member;

pairs of a second support member each formed of conductive material and being in a shape of an elongate plate shorter than the first support members each of the second support member having a plurality of first latch pieces perpendicular thereto being engaged with the openings of the first support member and a plurality of second latch pieces perpendicular thereto on a side opposite to that of the first latch pieces being attached to two opposite sides of the electronic device; and a predetermined portion of the computer case including at least one sub-frame having at least one pair of snapping members on two front ends thereof and one pair of rails on two opposite sides thereof;

whereby after the second support members are engaged with the first support members respectively and the second latch pieces are attached to the opposite sides of the electronic device, the electronic device can be inserted into the sub-frame along the rails, and the snapping members of the first support members are then engaged with the snapping members of the sub-frame for securing the electronic device to the sub-frame.

2. The mechanism of claim 1, wherein the snapping member of each first support member is a wedge.

3. The mechanism of claim 1, wherein the openings of the first support member each consist of one front slot adjacent to the resilient arm, two first holes adjacent to the front slot, one central elongate slot, one rear slot at the rear end of the respective first support member, and two second holes between the central elongate slot and the rear slot.

4. The mechanism of claim 3, wherein the first latch pieces consist of one front first latch piece engaged with the front slot, a plurality of central first latch pieces engaged with the upper and lower sides of the first support member at the position around the central elongate slot, and one rear first latch piece engaged with the rear slot respectively.

5. The mechanism of claim 1, wherein the snapping member of the sub-frame is a hole.

6. The mechanism of claim 1, wherein the electronic device is a CD-ROM.

7. The mechanism of claim 1, wherein the electronic device is a floppy disk.

* * * * *